A. W. & N. C. COOKE.
CASH REGISTER, MEMORANDUM APPLIANCE, AND THE LIKE.
APPLICATION FILED APR. 16, 1912.

1,113,756.

Patented Oct. 13, 1914.
6 SHEETS—SHEET 4.

Witnesses
Grace P. Brereton
Albert Popkins

Inventors
A. W. Cooke
N. C. Cooke
By Sturtevant & Mason
Attorneys

A. W. & N. C. COOKE.
CASH REGISTER, MEMORANDUM APPLIANCE, AND THE LIKE.
APPLICATION FILED APR. 16, 1912.

1,113,756.

Patented Oct. 13, 1914.

A. W. & N. C. COOKE.
CASH REGISTER, MEMORANDUM APPLIANCE, AND THE LIKE.
APPLICATION FILED APR. 16, 1912.

1,113,756. Patented Oct. 13, 1914.

UNITED STATES PATENT OFFICE.

ARTHUR WATERHOUSE COOKE AND NICHOLAS CHARLES COOKE, OF ROCK FERRY, ENGLAND.

CASH-REGISTER, MEMORANDUM APPLIANCE, AND THE LIKE.

1,113,756. Specification of Letters Patent. Patented Oct. 13, 1914.

Application filed April 16, 1912. Serial No. 691,084.

*To all whom it may concern:*

Be it known that we, ARTHUR WATERHOUSE COOKE and NICHOLAS CHARLES COOKE, subjects of the King of Great Britain, both residing in Rock Ferry, in the county of Chester, in the Kingdom of England, have invented certain new and useful Improvements in and Relating to Cash-Registers, Memorandum Appliances, and the like, of which the following is a specification.

This invention relates to apparatus for use in recording business transactions and so forth as in cash registers, check tills, check registers, memorandum appliances and the like.

The invention relates more particularly to the class of such apparatus in which a movable record sheet is used which sheet comes under an aperture in the case of the apparatus so as to receive a written record, and is then fed forward. Apparatus of this class are generally known as "autographic" recorders, registers, or the like.

One object of the invention is to provide in such apparatus an improved arrangement for varying the extent to which the record sheet is fed forward after each record has been made.

Another object of this invention is to combine means for automatically giving an additional feed to the record sheet at intervals, with means for varying the extent of feeding forward of the record sheet.

Another object of this invention is to provide improved means for automatically feeding forward the record sheet at intervals so as to provide blank spaces in the column of items on the said sheet.

Further objects of the invention will be made evident by the following detailed description of the embodiment of the invention shown in the accompanying drawings.

In these drawings.

Figure 2:
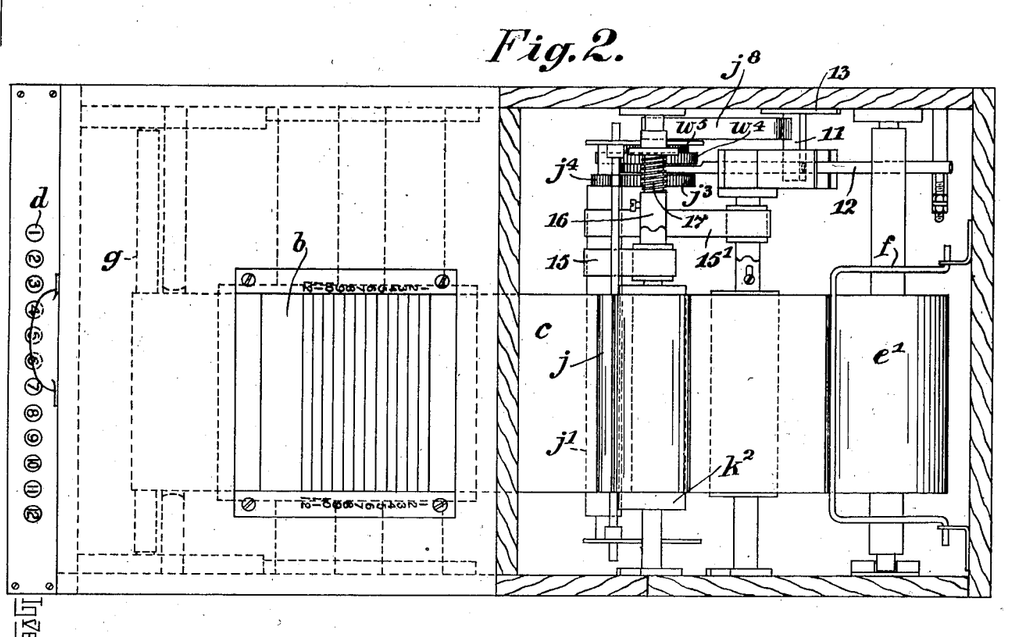
Fig. 2 shows a plan view of the till, part being in section on the line 2—2 of Fig. 1.

The till drawer $a$ is, as usual, arranged in the front part of the till, and in the upper part an aperture $b$ is provided to permit access to be obtained to the paper ribbon $c$ for the purpose of writing the amounts paid into the till. In accordance with the present invention this aperture is of considerable length in the direction of movement of the ribbon of paper so as to provide space for writing a series of entries to enable the matter to be recorded. In order to make clear what space is to be occupied by each line on the paper, the aperture $b$ is preferably provided with cross wires or other dividing means, as shown in Fig. 2, and the spaces are numbered. In the example illustrated twelve spaces are provided, and twelve keys $d$ correspondingly numbered are arranged at the front of the machine. When all the items to be entered have been written down, the operator depresses the key $d$ bearing the number corresponding to the last line on which he has written. He then draws out the drawer $a$ and this causes the paper ribbon to be drawn forward to an extent corresponding to the number of lines written, so that none of these remain in view through the aperture $b$.

Figure 8:
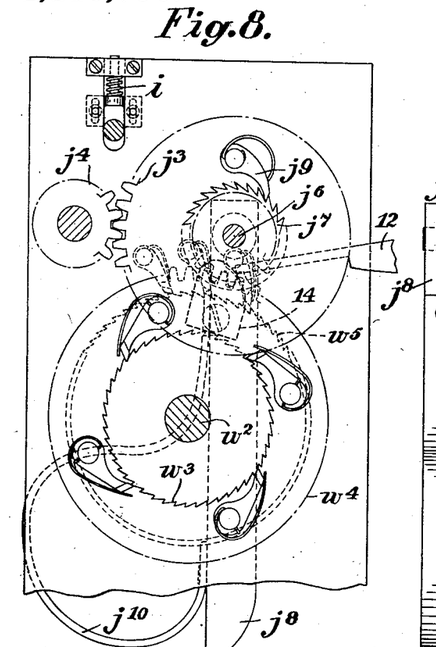
Fig. 8 is a section on line 8—8 of Fig. 4.

In the arrangement illustrated two ribbons of paper are used, so that by inserting a piece of transfer paper between them, a duplicate of the entries can be made. The supply rolls of paper are mounted at the rear of the machine and are indicated by $e'$ and $e^2$. Each of these rolls is provided with a bar $f$ for preventing the rolls from becoming unwound or slack. The two ribbons of paper pass to the front of the machine where they travel together around the guide bar $g$. They then pass over the table $h$, the upper ribbon being there exposed in the aperture $b$. From this point the ribbons pass between feed rolls $j$ and $j'$, the lower one of which, $j'$, is driven by the feeding mechanism. These rolls are arranged so as to tightly grip the paper between them so as to avoid slipping. The upper roll $j$ is preferably mounted in spring bearings, for instance as shown at $i$, Fig. 8, for the purpose of insuring the desired degree of pressure between the rolls $j$ and $j'$. After passing between these rolls the two ribbons are separated, one of them being wound up at $k'$ and the other at $k^2$. The rolls $e'$, $e^2$, $k'$, $k^2$ are of course mounted so that they may readily be removed for the purpose of inserting or taking off rolls of paper. The rolls $k'$ and $k^2$ will preferably be separated by a partition which is not shown, so that access can only be obtained to them through different doors, which permits of providing that a person who has access to one of the rolls cannot have access to the other.

Figure 3:
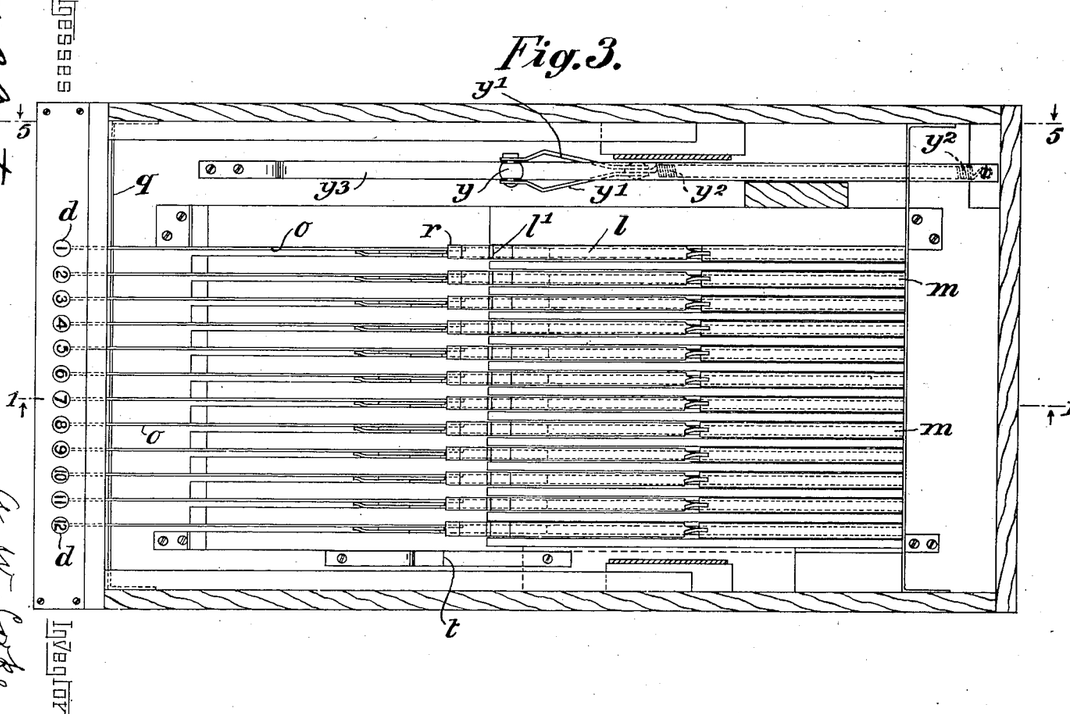
Fig. 3 is a horizontal section taken on the line 3—3 of Fig. 1.
Figure 6:
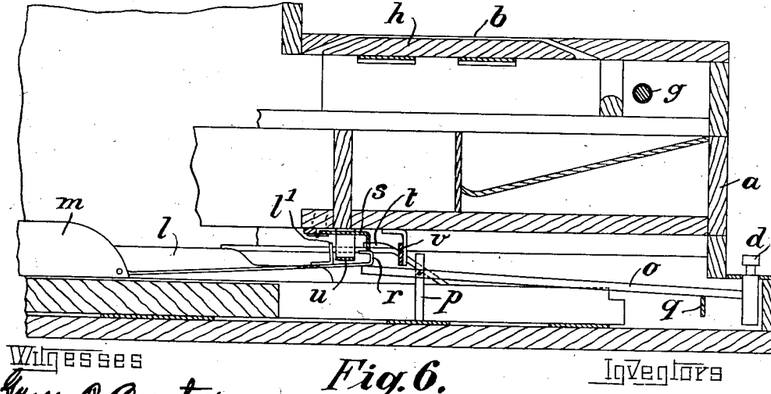
Figs. 6 and 7 are vertical longitudinal sections of the front part of the till, taken on the line 1—1 of Fig. 3, looking in the direction opposite to that indicated by the arrows attached to that line.
Figure 7:
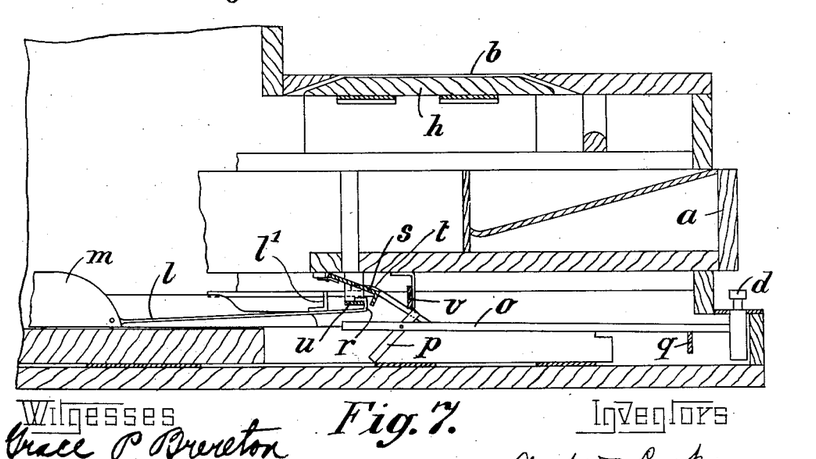

In the lower part of the machine is arranged a set of sliding bars $l$ which have attached to their rear ends upstanding cam pieces $m$. There is a bar $l$ corresponding to each of the numbered keys $d$. The pieces $m$ work between guide bars $n$ and the upper surfaces of these guide bars serve as supports for the flat bars $l$. Between the bars $n$ at the front part of the machine lie the key actuated levers $o$. Near the end of each of these levers is pivotally mounted a short bar $p$, see Figs. 1, 6 and 7. When the drawer is closed all the bars $l$ and pieces $m$ are in their rear positions, and the rear ends of the levers $o$ lie between the guide bars $n$ beneath the front ends of the bars $l$, this position being shown in Fig. 1. When the key $d$ is depressed the lever $o$ turns about the upper edge of the bar $q$ and its rear end strikes against the under surface of the front end of the bar $l$. This latter is provided with a hook $r$ the upper surface of which in the closed position of the drawer supports a pivotal bar $s$ of L-section which is attached to the drawer $a$. The upward movement of the rear end of the lever $o$ is accordingly limited, so that it can only slightly exceed the extent shown in Fig. 6. As the rear end of the lever $o$ is raised, the longer arm of the bar $p$ falls, and comes into the position shown in Fig. 6, then acting as a strut to maintain the lever $o$, the bar $l$ and the transverse bar $s$ in the positions shown in Fig. 6. On one end of the transverse bar $s$ is a projection $s'$, see Fig. 10, which when the bar is in its lower position, lies behind a catch $t$ arranged at the right-hand side of the machine, see Figs. 3, 6 and 7. The location of the projection $s'$ behind the catch $t$ prevents the opening of the drawer $a$. It will be seen however that when the bar $s$ has been raised into the position shown in Fig. 6, the projection $s$ is lifted above the catch $t$ so that the drawer can then be drawn out. During the first part of the outward movement of the drawer, the hook $r$ on the raised bar $l$ engages over the edge of a transverse plate $u$ attached to the drawer $a$. The pivotal bar $s$ then falls to the position shown in Fig. 7. About the same time another transverse bar $v$ carried by the drawer $a$ strikes against the upper end of the bar $p$ and turns this bar from the vertical position, as shown in Fig. 7, so that the lever $o$ then falls and the key $d$ returns to its raised position. The drawer then completes its forward movement taking with it the bar $l$ and its cam piece $m$. In the course of its movement the front surface of the piece $m$ strikes against one of the teeth of a comb-like structure $w$ attached at each end to crank arms $w'$ which are mounted fast on the shaft $w^2$. The movement of the piece $m$ causes the comb $w$ to be raised, thus turning the shaft $w^2$.

Figure 1:
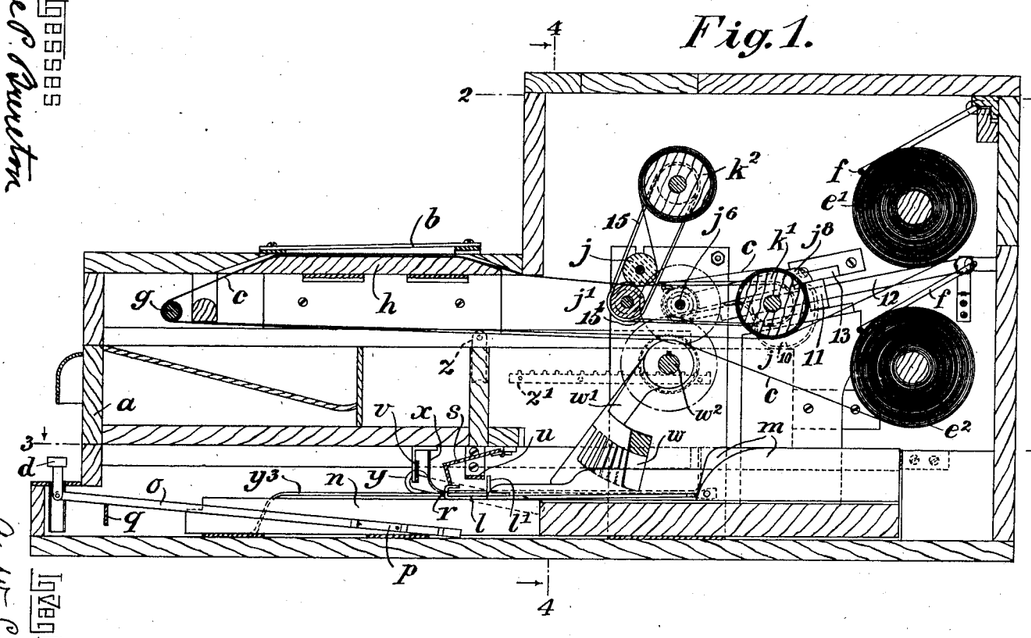
—Figure 1 is a vertical longitudinal section of a till embodying the preferred form of this invention, the section being taken on the line 1—1 of Fig. 3.
Figure 4:
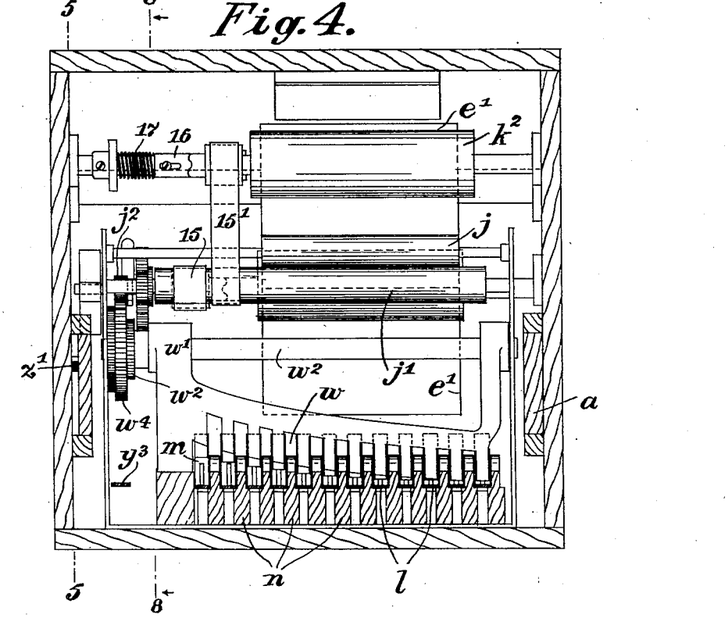
Fig. 4 is a vertical transverse section on the line 4—4 of Fig. 1.

It will be seen by reference to Figs. 1 and 4 that the comb $w$ does not lie in a straight line across the machine, but is curved so that the pieces $m$ near the right-hand side of the machine will strike the comb at earlier points in their forward movements than the pieces situated near the left hand side of the machine. The teeth of the comb $w$ are so positioned and the pieces $m$ are so shaped that the angle of movement of the shaft $w^2$ when the drawer is drawn forward is proportional to the number on the key $d$ which is depressed.

Instead of forming the transverse member $w$ as a comb, it might be made as a plain bar curved to the shape of the comb. The reason for providing teeth is that in the arrangement illustrated upward extensions of the bars $n$ are provided at the rear to assist in guiding the pieces $m$, and it is necessary for the parts of the member $w$ against which the pieces $m$ strike to pass between the upward extensions of the bars $n$. As a further alternative the member $w$ might be straight instead of curved, the difference in the extent of its movement being produced by suitably shaping the different pieces $m$. The movement of the shaft $w^2$ which takes place when a piece $m$ comes against a tooth of the comb $w$ produces the feeding forward of the paper ribbons, as will be hereinafter explained.

Figures 5, 10:
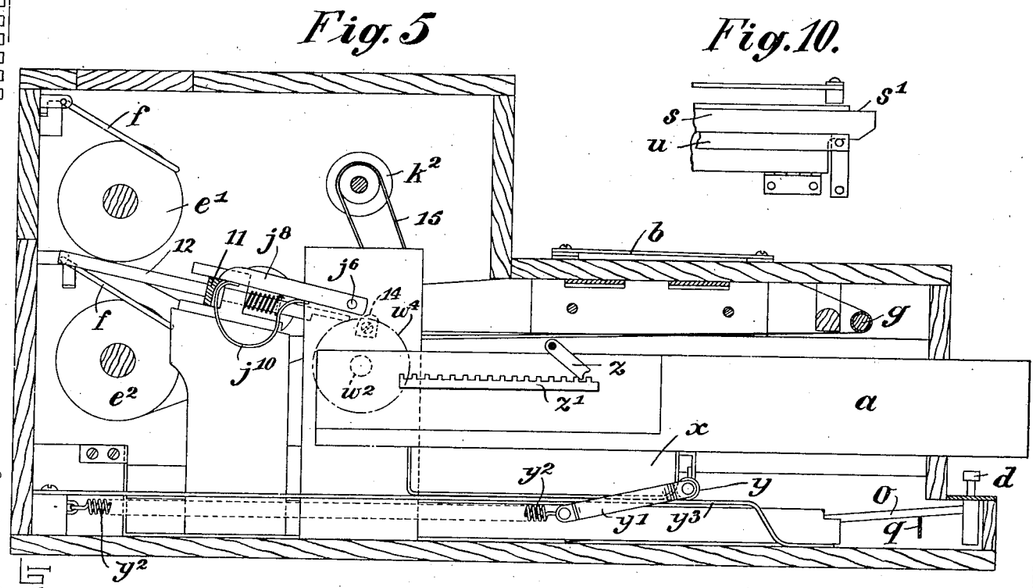
Fig. 5 is a longitudinal vertical section on the line 5—5 of Fig. 3 and Fig. 4.
Fig. 10 shows a detail of the mechanism by which the drawer is prevented from being opened when no key is depressed.

At one side of the underneath part of the drawer $a$ there is arranged a downwardly extending piece $x$, see Figs. 1 and 5. The front end of this piece is normally in engagement with the roller $y$ which is attached by means of a forked link $y'$ to a spring $y^2$. Through the forked part of the link $y'$ passes a flat bar $y^3$ which extends to the rear of the machine, and has near its front end a downwardly extending portion. As the drawer is moved forward the roller $y$ is caused to travel along the bar $y^3$, the spring $y^2$ being extended and exerting a retractive force on the drawer. When the drawer has moved forward to a certain extent the roller $y$ passes on to the downwardly inclined portion of the bar $y^3$ so that the projecting piece $x$ can ride over the top of the roller. Accordingly after this point has been reached, the spring $y^2$ exerts no retractive force on the drawer, so that the drawer will remain in its open position. During the return movement the reverse series of operations takes place, so that after the drawer has traveled rearwardly to a certain extent the roller $y$ rises up in front of the piece $x$ and the spring $y^2$ comes into action to assist the completion of the return movement of the drawer. As previously indicated the hook $r$ on the raised bar $l$ remains in engagement with the transverse plate $u$ during the whole of the forward movement of the drawer. As soon as the drawer commences its return movement, the plate $u$ is moved out of the hook $r$ and travels a short distance without imparting movement to the bar $l$. It then strikes against the projection $l'$ on the bar $l$, and remains in contact with this projection during the rest of the rearward movement, so that the bar $l$ and the piece $m$ are returned to their original positions.

A device is provided on the drawer to prevent it from being partially drawn out, and then returned, since if this were possible the drawer could be opened and closed again without the paper feeding device being actuated to the extent desired. The form of device shown in the drawings is a reversible pawl $z$ which coöperates with a rack $z'$. The pawl is mounted on the casing and the rack is on the drawer $z'$ and is of such a length and is so located on the drawer, that in the extreme positions of the latter, the pawl falls clear of the end of the rack so that it can reverse its direction of inclination, so as to be equally operative during the next movement of the drawer in the opposite direction.

The feed roller which is positively driven is actuated from the rotatable shaft previously mentioned by gearing which preferably gives a considerably greater angular movement to the roller than that made by the rotatable shaft, and the gearing comprises a ratchet or equivalent device which insures that the rotatable shaft only transmits motion to the feed roll when moving in one direction. In the arrangement shown in the drawings the shaft $w^2$ is provided with a ratchet wheel $w^3$ which during the upward movement of the crank arms $w'$ drives by means of its pawls a toothed wheel $w^4$ which gears with a pinion $j^2$ which is fast on a sleeve working on the shaft $j^6$ also carrying the toothed wheel $j^3$ which gears with the pinion $j^4$. The ratchet wheel $w^3$ provides that the crank arm $w'$ only imparts motion to the driving gear during its upward movement, and a ratchet wheel $w^5$ on the other side of the toothed wheel $w^4$ provides for the locking of this wheel, so that it cannot take part in the return movement of the shaft $w^2$.

Figure 9:
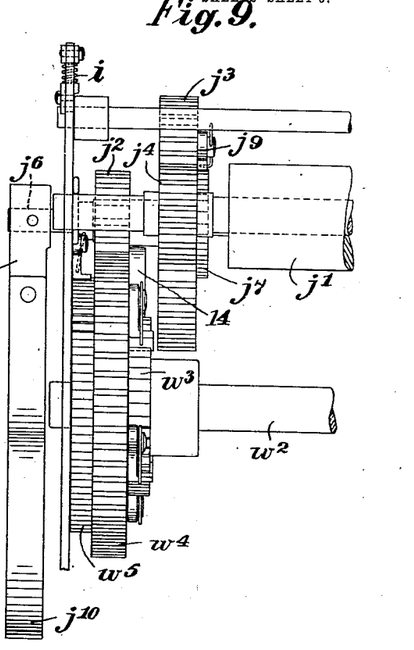
Fig. 9 is an elevation at right-angles to the plane of Fig. 8. These two figures show on an enlarged scale part of the mechanism by which the paper is fed forward.

In order to produce at intervals a blank space in the column of items on the ribbons, means are provided for turning the feed roller $j'$ at intervals in excess of the movement imparted by the operation of the crank arm $w'$. This excess movement is brought about by a member which is controlled by the feed mechanism so as to be released at intervals thereby. It preferably receives its movement from the drawer. In the arrangement illustrated this additional movement is given by the action of the weighted arm $j^8$ which normally stands in the raised position shown in Fig. 1, but is adapted to be released at intervals and to then fall toward the position shown in Figs. 8 and 9. This arm $j^8$ is fast on the shaft $j^6$ on which is also mounted the ratchet wheel $j^7$. As the arm falls to its lower position, the ratchet wheel $j^7$ turns with it, the teeth slipping under the pawl $j^9$ which is mounted on the toothed wheel $j^3$. On the under side of the arm $j^8$ is a curved bar $j^{10}$ which, when the arm is in its lower position, projects into the path of the side piece of the drawer $a$, which is extended to a sufficient distance to the rear for it to strike against the bar $j^{10}$ and lift the arm $j^8$ to its upper position, when the drawer is closed. During this lifting movement the shaft $j^6$ with the ratchet wheel $j^7$ are of course turned and motion is imparted to the wheel $j^3$ by means of the pawl $j^9$. This causes the pinion $j^4$ and the roller $j'$ to turn.

When the arm $j^8$ is raised its end presses against and finally rides over a spring catch 11 which retains it in its upper position. This spring catch is carried by the bar 12 which slides in a guide 13 and is normally held by a spring in the position in which it engages the end of the arm $j^8$. The lower end of the bar 12 lies in the path of a projection 14 carried by the toothed wheel $w^4$, see Fig. 8. When this projection 14 comes into the position shown in Fig. 8, it presses against the end of the bar 12 and further movement of the wheel $w^4$ by means of the crank arm $w'$ causes the projection 14 to force back the bar 12 against the action of its spring, and remove the catch 11 from beneath the end of the arm $j^8$, allowing it to fall. This release of the catch takes place during the opening of the drawer, so that the arm $j^8$ is at once returned to its upper position when the drawer is closed again.

In order that the rollers $k'$ and $k^2$ may take up the proper ribbons as they are fed forward by the rollers $j$ and $j'$, a driving connection is arranged between the shaft of the roller $j'$ and the rollers $k'$ and $k^2$. As illustrated this driving connection consists of belts $15'$ and 15 which pass around the end of the roller $j'$ and around the pulleys on the shafts of the rollers $k^2$ and $k'$ respectively. Since the size of the rolls of paper on the rollers $k'$ and $k^2$ will vary, it follows that the rate of rotation of these rollers relative to the feed rollers $j$ and $j'$ must also vary. This is provided for by mounting the belt pulleys on sleeves on the shafts of the rollers $k'$ and $k^2$, and arranging friction couplings in the form of slipping clutches connecting the sleeves with the shafts. The arrangement is shown on Fig. 4 where it will be seen that the sleeves on which the pulleys are mounted have rounded teeth which are adapted to fit in corresponding teeth on sleeves 16 which can slide longitudinally on the shaft, but are not free to rotate relative thereto, since there is a pin on the shaft working in a longitudinal slot in the sleeve. The teeth of each pair of sleeves are normally kept in engagement by means of a spring 17. These frictional couplings are so designed that if there is a tendency to wind up the paper on to the rollers $k$ and $k'$ faster than the feed rollers $j$ and $j'$ deliver the paper, the couplings will slip, the sleeves 16 being forced away from the pulleys, so that the teeth of one sleeve can slide over the teeth of the adjacent sleeve.

We declare that what we claim is:—

1. An appliance of the kind described comprising means for feeding forward a record receiving strip, a sliding drawer actuating said feeding means, means for preventing the return of said drawer until it has been drawn out to the desired extent so that it travels on each occasion through the same distance, means for varying the extent of the movement transmitted from the drawer to the feeding means, a series of controlling members acting upon the said varying means, each of said controlling members producing a different degree of variation.

2. An appliance of the kind described comprising means for feeding forward a record receiving strip, a support for the strip during the writing of the record, means adjacent to said support for indicating the length of the strip occupied by each record, a sliding drawer actuating said feeding means, means for preventing the return of said drawer until it has been drawn out to the desired point so as to necessitate a movement of the drawer through the same distance on each occasion, means for varying the extent of the movement transmitted from the drawer to the feeding means, a series of controlling members acting upon the said varying means, said members bearing marks corresponding to marks on said indicating means so that the selection of the controlling member to be actuated may be made in accordance with the extent of the strip occupied by the record.

3. An appliance of the kind described comprising a casing inclosing the record receiving strip, said casing having an aperture through which access can be obtained to the strip for the purpose of making a record thereon, indicating means adjacent to said aperture for showing the length of the strip occupied by each record, said indicating means bearing a series of marks, one for each arbitrary unit of length of strip, means for feeding forward the strip, a sliding drawer in said casing actuating said feeding means, means for preventing the return of the said drawer until it has been drawn out to the desired point so as to necessitate a movement of the drawer through the same distance on each occasion, means for varying the extent of the movement transmitted from the drawer to the feeding means, means for controlling said varying means, said controlling means comprising a series of members bearing marks corresponding to the marks on the indicating means so that the controlling member can be selected to correspond with the length of the strip occupied by a record.

4. An appliance of the kind described comprising means for feeding forward a record receiving strip, a sliding drawer actuating said feeding means, means for preventing the return of said drawer until it has been moved forward to the desired point so as to necessitate a movement of the drawer through the same distance on each occasion, means for varying the extent of the movement transmitted from the drawer to the feeding means, means for locking the drawer against movement, said locking means being controlled by said feed varying means.

5. An appliance of the kind described comprising means for feeding forward a record receiving strip, means, comprising a rotatable shaft, for actuating the feeding means, a crank member carried by said shaft, a series of sliding members engaging with said crank member and each imparting a different degree of movement to it, a further sliding member and means for connecting to said member at will any one of the series of separate sliding members.

6. An appliance of the kind described comprising means for feeding forward a record receiving strip, means, comprising a rotatable shaft, for actuating the feeding means, a crank member carried by said shaft, a series of sliding members engaging with said crank member and each imparting a different degree of movement to it, a further sliding member, means for connecting to said member at will any one of the series of separate sliding members, a series of keys, one corresponding to each of said separate sliding members, and means controlled by each of said keys for actuating the said connecting means.

7. An appliance of the kind described comprising means for feeding forward a record receiving strip, means, comprising a rotatable shaft, for actuating the feeding means, a crank member carried by said shaft, a series of separate sliding members acting upon said crank member and each imparting a different degree of movement thereto, a sliding drawer, a series of separate connecting means, a series of keys one corresponding to each of said separate sliding members and means controlled by each of said keys for bringing into action the corresponding connecting means to connect one of the sliding members to the drawer for actuation thereby.

8. An appliance of the kind described comprising means for feeding forward a record receiving strip, means, comprising a rotatable shaft, for actuating the feeding means, a series of separate sliding members moving transversely to said shaft and all adapted to be moved to the same extent, a curved crank member attached to said shaft and adapted to be engaged by each of said sliding members when it is moved, said crank member by reason of its curved form being moved to a different extent by each of said sliding members, and means for imparting motion to any one of said sliding members at will.

9. An appliance of the kind described, comprising in combination means for feeding forward a record receiving strip, a series of separate sliding members each imparting to said feeding means, at each operation, a movement of an extent different from those imparted by the other members, a movable actuating member, and means for coupling at will any one of said sliding members to the actuating member, so that said sliding member may transmit a movement of a determined extent from the actuating member to the feeding means.

10. An appliance of the kind described, comprising in combination means for feeding forward a record receiving strip, a series of separate sliding members each imparting to said feeding means, at each operation, a movement of an extent different from those imparted by the other members, a movable actuating member, means for coupling at will any one of said sliding members to the actuating member, so that said sliding member may transmit a movement of a determined extent from the actuating member to the feeding means, and a set of keys controlling said coupling means.

11. An appliance of the kind described, comprising in combination means for feeding forward a record receiving strip, a series of separate sliding members each imparting to said feeding means, at each operation, a movement of an extent different from those imparted by the other members, a movable actuating member, means for coupling at will any one of said sliding members to the actuating member, so that said sliding member may transmit a movement of a determined extent from the actuating member to the feeding means, means for locking said actuating member against movement, and means for taking the locking means out of action when the coupling means is actuated.

12. An appliance of the kind described, comprising in combination means for feeding forward a record receiving strip, a series of sliding members, each, at each operation, imparting to said feeding means a movement of an extent different from those imparted by the other members, a movable actuating member, means for locking said actuating member against movement, a set of keys, means controlled by said keys for coupling any one of the sliding members to the actuating member and, at the same time, taking out of action the locking means.

13. An appliance of the kind described, comprising in combination means for feeding forward a record receiving strip, indicating means located adjacent to the place at which the record is made on the strip, said indicating means serving to show the length of the strip occupied by each record when it has been made, a series of sliding members, each, at each operation, imparting to the said feeding means a movement of an extent different from those imparted by the other sliding members, a movable actuating member, a set of keys, one corresponding to each of said sliding members, and each bearing a mark corresponding to a mark on the indicating means, and means controlled by said keys for coupling any one of said sliding members to the actuating member, so that said sliding member may transmit a movement of determined extent from the actuating member to the feeding means.

14. An appliance of the kind described comprising means for feeding forward a record receiving strip, a movable actuating member, a series of transmitting members adapted to transmit different degrees of movement to the feeding means, means for coupling the transmitting members to the actuating member, said means comprising a projection on the actuating member, a hook on each of the transmitting members and means for engaging said hooks with said projection.

15. An appliance of the kind described comprising means for feeding forward a record receiving strip, a movable actuating member, a series of transmitting members adapted to transmit different degrees of movement to the feeding means, means for coupling the transmitting members to the actuating member, said means comprising a projection on said actuating member, a hook on each of said transmitting members, a set of keys one corresponding to each transmitting member, and means actuated by each of said keys for engaging the hook of the corresponding transmitting member with the projection on the actuating member.

16. An appliance of the kind described comprising means for feeding forward a record receiving strip, a movable actuating member, a series of transmitting members adapted to transmit different degrees of movement to the feeding means, means for coupling the transmitting members to the actuating member, said means comprising a projection on the actuating member, a hook on each of said transmitting members, means for moving any one of said hooks into the path of the said projection, and means for supporting any one of said hooks when so adjusted until the movement of the actuating member engages the hook with the projection.

17. An appliance of the kind described comprising means for feeding forward a record receiving strip, a movable actuating member, a series of members for transmitting movement from said actuating member to said feeding means, a projection on said actuating member, a hook on each of said transmitting members, a set of keys one corresponding to each of said transmitting members, levers connected with said keys and acting upon the hooks of the transmitting members so that as a key is depressed the corresponding hook is raised into the path of the projection on the actuating member.

18. An appliance of the kind described comprising means for feeding forward a record receiving strip, a movable actuating member, a series of members for transmitting movement from said actuating member to said feeding means, a projection on said actuating member, a hook on each of said transmitting members, a set of keys one corresponding to each of said transmitting members, levers connected with said keys and acting upon the hooks of the transmitting members so that as a key is depressed the corresponding hook is raised into the path of the projection on the actuating member, means for retaining each lever in position to support the hook in the path of the projection until the actuating member is moved, and means carried by said actuating member for putting said retaining means out of action.

19. An appliance of the kind described comprising means for feeding forward a record receiving strip, a movable actuating member, a series of members transmitting motion from said actuating member to said feeding means, means for locking said actuating member against movement, a projection on said actuating member, a hook on each of said transmitting members, means for moving any one of said hooks into the path of said projection and at the same time taking out of action the locking means.

20. An appliance of the kind described comprising means for feeding forward a record receiving strip, a sliding drawer adapted to serve as the actuating member for said feeding means, a set of members transmitting motion from said drawer to said feeding mechanism, means for locking said drawer in the closed position, means for coupling any one of said transmitting members to the said drawer, a series of keys controlling said coupling means and said locking means.

21. An appliance of the kind described comprising means for feeding forward a record receiving strip, a sliding drawer adapted to serve as the actuating member for said feeding means, a set of members transmitting motion from said drawer to said feeding mechanism, a pivotal locking member on said drawer, a projection on said drawer, a hook on each of said transmitting members, said hooks lying adjacent to said pivotal member when in the locking position, means for bringing any one of said hooks into engagement with the said projection, and at the same time turning said pivotal member out of the locking position.

22. An appliance of the kind described comprising means for feeding forward a record receiving strip, an actuating member, means for transmitting motion from said actuating member to said feeding means, means for coupling said actuating member with said transmitting means, said coupling means comprising a plurality of hooks and a projection adapted to be engaged thereby, a series of controlling members for said coupling means, a lever actuated by each of said controlling members and acting upon one of said hooks, a pivotal bar carried by each of said levers and serving as a strut to support the lever and hook during the coupling operation, and means carried by the actuating member for turning said pivotal bars out of the supporting position after the coupling has been effected.

23. An appliance of the kind described comprising in combination means for feeding forward a record receiving strip, manually controlled means for adjusting the extent of the feed which takes place at each actuation of the feeding means, and means for automatically increasing at intervals the extent of the feed beyond that determined by the manually controlled means.

24. An appliance of the kind described, comprising in combination means for feeding forward a record receiving strip, manually controlled means for adjusting the extent of feed which is to take place at each actuation of the feeding means, and means controlled by the said feeding means for automatically increasing, at intervals, the extent of the feed beyond that determined by the manually controlled means.

25. An appliance of the kind described, comprising in combination means for feeding forward a record receiving strip, manually controlled means for adjusting the extent of feed which is to take place at each actuation of the feeding means, and means controlled by the movement of the strip for automatically increasing the extent of the feed beyond that determined by the manually controlled means, so that an additional feed occurs at regular intervals in the travel of the strip.

26. An appliance of the kind described comprising means for feeding forward a record receiving strip, indicating means located adjacent to the place at which the record is made on the strip, said indicating means showing the length of strip occupied by each record, manually controlled means for adjusting the extent of the feed which takes place at each actuation of the feeding means, the adjustment being adapted to be made in accordance with the indications of the indicating means, and means for automatically increasing the extent of the feed at intervals beyond that determined by the manually controlled means with the object of producing at intervals a blank space in the column of records on the strip.

27. An appliance of the kind described comprising means for feeding forward a record receiving strip, an actuating member for said feeding means, a pivotal member operatively connected with said feeding means, means for bringing said pivotal member at intervals into the path of the actuating member so that the pivotal member receives motion from the actuating member and transmits this motion to the feeding mechanism so as to produce an additional movement thereof.

28. An appliance of the kind described comprising means for feeding forward a record receiving strip, an operating member carried by the feeding means, means for imparting movement to said member, means for retaining said member against movement, means operated by the feeding mechanism for taking the retaining means out of action, and means for imparting through said member when released an additional movement to the feeding means.

29. An appliance of the kind described comprising means for feeding forward a record receiving strip, an operating member carried by said feeding means, a catch retaining said member in position, means operated by the feeding means for taking this catch out of action at intervals, means for imparting movement to said member when released, and means for returning said member to its original position and thereby imparting an additional movement to the feeding means.

30. An appliance of the kind described comprising means for feeding forward a record receiving strip, a movable actuating member adapted to impart motion to said feeding means, an operating member carried by said feeding means, a catch normally retaining said member in position, means operated by the feeding means for taking the catch out of action, and means for bringing the movable actuating member into engagement with the operating member when the latter is released, so as to impart an additional movement to the feeding means through the intermediary of said operating member.

31. An appliance of the kind described comprising means for feeding forward a record receiving strip, a sliding drawer serving as the actuating member for said feeding means, an operating member carried by said feeding means, a catch normally engaging said member, means operated by said feeding means for taking the catch out of action during the opening of the drawer, means for moving the operating member into the path of the drawer when released so that on the return of the drawer the operating member is returned thereby to its original position and by its return imparts an additional movement to the feeding mechanism.

32. An appliance of the kind described comprising means for feeding forward a record receiving strip, a reciprocating actuating member imparting motion to the said feeding means while moving in one direction, and automatic means for putting the actuating member at intervals into connection with the feeding means during movement in the opposite direction so as to give at intervals an additional movement to the feeding means.

33. An appliance of the kind described comprising means for feeding forward a record receiving strip, a movable actuating member imparting motion to said feeding means, a pivotal lever operatively connected with said feeding means, a catch normally engaging said lever, a projection mounted on a moving part of said feeding means and adapted at intervals to act upon the said catch to take it out of engagement, means for moving the pivotal lever into the path of the actuating member when released so that the said member can impart additional motion to the feeding means through the intermediary of the lever while restoring the latter to its original position.

34. An appliance of the kind described comprising means for feeding forward a record receiving strip, said means comprising a feed roll and a take-up roll; a rotary shaft, a wheel driven from said shaft, a positive driving means between said wheel and the feed roller, and a driving means including a slipping coupling between the said wheel and the take-up roller; means acting upon the rotary shaft for imparting different extents of movement thereto and manually controlled means for determining the extent of the movement to be imparted at each actuation of the feeding means.

In witness whereof, we have hereunto signed our names this 4th day of April 1912, in the presence of two subscribing witnesses.

ARTHUR WATERHOUSE COOKE.
NICHOLAS CHARLES COOKE.

Witnesses:
 RICHD. L. CLEAVER,
 RICHARD W. WILLIAMS.